US010073009B2

(12) United States Patent
Mawby et al.

(10) Patent No.: US 10,073,009 B2
(45) Date of Patent: Sep. 11, 2018

(54) TIRE UNIFORMITY IMPROVEMENT THROUGH MODIFIED SAMPLING OF UNIFORMITY PARAMETERS

(71) Applicants: William David Mawby, Greenville, SC (US); Ross Kunz, Greenville, SC (US)

(72) Inventors: William David Mawby, Greenville, SC (US); Ross Kunz, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 120 days.

(21) Appl. No.: 15/028,977

(22) PCT Filed: Nov. 8, 2013

(86) PCT No.: PCT/US2013/069094
§ 371 (c)(1),
(2) Date: Apr. 13, 2016

(87) PCT Pub. No.: WO2015/069272
PCT Pub. Date: May 14, 2015

(65) Prior Publication Data
US 2016/0238487 A1    Aug. 18, 2016

(51) Int. Cl.
*G01M 17/02*      (2006.01)
*B29D 30/06*      (2006.01)
*B29D 30/00*      (2006.01)

(52) U.S. Cl.
CPC ....... *G01M 17/022* (2013.01); *B29D 30/0061* (2013.01); *B29D 30/0633* (2013.01);
(Continued)

(58) Field of Classification Search
None
See application file for complete search history.

(56) References Cited

U.S. PATENT DOCUMENTS 4,285,240 A    8/1981   Gold
4,702,103 A   10/1987   Wenz
(Continued)

FOREIGN PATENT DOCUMENTS

| DE | 102005016323 | 10/2006 |
| WO | WO 2011/002439 | 1/2011 |
| WO | WO 2013/039505 | 3/2013 |

OTHER PUBLICATIONS

Warholic et al., "A Finite Element Analysis of Curing Bladder Shaping," *Tire Science and Technology*, TSTCA, vol. 16, No. 3, Jul.-Sep. 1988, pp. 128-145.
(Continued)

*Primary Examiner* — Peter Macchiarolo
*Assistant Examiner* — Jermaine Jenkins
(74) *Attorney, Agent, or Firm* — Dority & Manning, P.A.

(57) ABSTRACT

Methods and systems for improving tire uniformity through identification of uniformity attributes, such as process harmonics are provided. More particularly, uniformity measurements acquired according to a non-uniform sampling pattern can be obtained and analyzed to estimate one or more process harmonics (e.g. the magnitude of the process harmonic). The non-uniform sampling pattern can specify the acquisition of uniformity measurements in a varying or irregular manner about one or more revolutions of the tire. For instance, the non-uniform sampling pattern can specify a random spacing between data points. The uniformity attributes estimated from the uniformity measurements can be used to modify the manufacture of tires to improve tire uniformity.

7 Claims, 6 Drawing Sheets

(52) U.S. Cl.
CPC ............... *B29D 2030/0066* (2013.01); *B29D 2030/0635* (2013.01)

(56) References Cited

U.S. PATENT DOCUMENTS

| | | | |
|---|---|---|---|
| 4,805,125 | A | 2/1989 | Beebe |
| 4,984,393 | A | 1/1991 | Rogers, Jr. |
| 5,036,113 | A | 7/1991 | Boon et al. |
| 5,060,173 | A | 10/1991 | Tsuji |
| 5,062,781 | A | 11/1991 | Szyms et al. |
| 5,639,962 | A | 6/1997 | Maloney |
| 5,845,232 | A | 12/1998 | Shively et al. |
| 6,257,956 | B1 | 7/2001 | Shteinhauz et al. |
| 6,705,156 | B2 | 3/2004 | Shteinhauz et al. |
| 6,856,929 | B1 | 2/2005 | Mawby et al. |
| 7,082,816 | B2 | 8/2006 | Zhu |
| 7,213,451 | B2 * | 5/2007 | Zhu .................... G01M 17/022 73/146 |
| 7,811,398 | B2 * | 10/2010 | Moriguchi ............ B29D 30/26 156/131 |
| 8,287,675 | B2 | 10/2012 | Mawby et al. |
| 8,544,319 | B2 | 10/2013 | Mawby |
| 9,310,278 | B2 * | 4/2016 | Sukegawa ............ G01B 11/24 |
| 9,618,425 | B2 * | 4/2017 | Clark .................... G01M 17/02 |
| 9,645,052 | B2 * | 5/2017 | Mawby ................. G01M 17/02 |
| 2005/0081614 | A1 | 4/2005 | Zhu |
| 2007/0084541 | A1 * | 4/2007 | Moriguchi ......... B29D 30/0061 156/117 |
| 2011/0246128 | A1 | 10/2011 | Nicholson et al. |
| 2012/0035757 | A1 | 2/2012 | Mawby et al. |
| 2013/0098148 | A1 | 4/2013 | Mawby et al. |
| 2013/0253686 | A1 * | 9/2013 | Flament ................ G01M 17/02 700/117 |
| 2014/0338437 | A1 * | 11/2014 | Mawby ............. B29D 30/0633 73/146 |
| 2016/0116363 | A1 * | 4/2016 | Mawby ............. G01M 17/024 73/146 |

OTHER PUBLICATIONS

PCT International Search Report for PCT/US2013/069082, dated Mar. 17, 2013—7 pages.
PCT International Search Report for PCT/US2013/069094, dated Mar. 17, 2013—7 pages.

* cited by examiner

TIRE UNIFORMITY IMPROVEMENT THROUGH MODIFIED SAMPLING OF UNIFORMITY PARAMETERS

FIELD

The present disclosure relates to tire uniformity and more particularly to improving the uniformity of tires based on uniformity parameters acquired according to a modified sampling pattern.

BACKGROUND

Tire non-uniformity relates to the symmetry (or lack of symmetry) relative to the tire's axis of rotation in certain quantifiable characteristics of a tire. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity parameters, or attributes, are generally categorized as dimensional or geometric variations (radial run out and lateral run out), mass variance, and rolling force variations (radial force variation, lateral force variation and tangential force variation, sometimes also called longitudinal or fore and aft force variation). Uniformity measurement machines often calculate the above and other uniformity characteristics by measuring force at a number of points around a tire as the tire is rotated about its axis to generate a uniformity waveform.

Many different factors can contribute to the presence of uniformity characteristics in tires. Uniformity dispersions in tires can result from both tire harmonic uniformity effects and process harmonic uniformity effects. Tire harmonic uniformity effects have periods of variation that coincide with the tire circumference (e.g. fit an integer number of times within the tire circumference). Tire harmonic uniformity effects can be attributable to tread joint width, out-of-roundness of the building drums, curing press effects, and other effects. Process harmonic uniformity effects have periods of variation that do not coincide with the tire circumference. Process harmonic effects are generally related to process elements rather than tire circumference. Typical process harmonic effects can be caused, for instance, in the preparation of a semi-finished product (e.g. a tread band), by thickness variations due to the extruder control system or by rollers that can deform the shape of softer products. The impact of the process harmonic effect can change from tire to tire depending on the rate of introduction of the process harmonic effect relative to the tire circumference.

Tire uniformity parameters are typically measured or sampled at a plurality of equally spaced data points (e.g. 128 data points or 256 data points) for a rotation of the tire. The sampling of uniformity measurements at equally spaced data points can be used to construct uniformity waveforms for the tire. The uniformity waveforms can then be analyzed (e.g. by using Fourier decomposition or by estimating coefficients of a mathematical model modeling the uniformity measurement) to identify various uniformity attributes of interest, such as various tire harmonics and process harmonics of the uniformity parameter.

A problem with sampling the uniformity parameter of a tire at equally spaced data points about the tire can be that certain uniformity effects may not have maximum impact on the tire at the location of one of the discrete data points. This can cause errors in estimating the impact of certain uniformity effects contributing the uniformity of the tire, leading to reduced uniformity yield due to the fact more tires may exceed sorting limits.

As one example, a process harmonic may not manifest itself at a discrete data point when the uniformity of the tire is sampled at equally spaced data points around the tire. For instance, the peak of the process harmonic uniformity effect can be located between two sampled data points obtained for a tire. The peak of the process harmonic uniformity effect, however, will appear to be located at the nearest neighboring data point. Accordingly, an equally spaced sampling pattern may not naturally sample the process effect across a set of tires, leading to errors in estimating the process harmonic from uniformity measurements obtained using the equally spaced sampling pattern.

Thus, a need exists for improving the sampling of uniformity measurements about a tire to improve the estimation of uniformity effects, such as process harmonic uniformity effects.

SUMMARY

Aspects and advantages of the invention will be set forth in part in the following description, or may be apparent from the description, or may be learned through practice of the invention.

One example aspect of the present disclosure is directed to a method for improving the uniformity of a tire. The method includes identifying a non-uniform sampling pattern for measuring a uniformity parameter for one or more tires. The non-uniform sampling pattern has a plurality of data points. The method further includes obtaining a plurality of uniformity measurements for the one or more tires. The plurality of uniformity measurements are acquired according to the non-uniform sampling pattern. The method can further include estimating a harmonic component of the uniformity parameter using the plurality of uniformity measurements and modifying the manufacture of a tire based at least in part on the harmonic component.

Another example aspect of the present disclosure is directed to a system for improving the uniformity of a tire. The system can include a uniformity measurement machine configured to obtain uniformity measurements for the tire according to a non-uniform sampling pattern for one or more revolutions of a tire. The non-uniform sampling pattern has a plurality of data points. The system can further include one or more computing devices coupled to the measurement machine. The one or more computing devices can include one or more processors and at least one memory. The at least one memory can store computer-readable instructions that when executed by the one or more processors cause the one or more processors to perform operations. The operations can include estimating a harmonic component of the uniformity parameter using the plurality of uniformity measurements. The non-uniform sampling pattern can specify an unequal spacing between the plurality of data points.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 plots azimuthal location about the tires along the abscissa and magnitude of the process harmonic along the ordinate.

FIG. 3 plots data points of the sampling pattern along the azimuth of the tire.

FIG. 4 plots data points of the sampling pattern along the azimuth of the tire.

FIG. 5 plots data points of the sampling pattern along the azimuth of the tire.

FIG. 6 plots azimuth about the tire along the abscissa and magnitude of a cosine value associated with the process harmonic along the ordinate.

DETAILED DESCRIPTION

Figure 1:
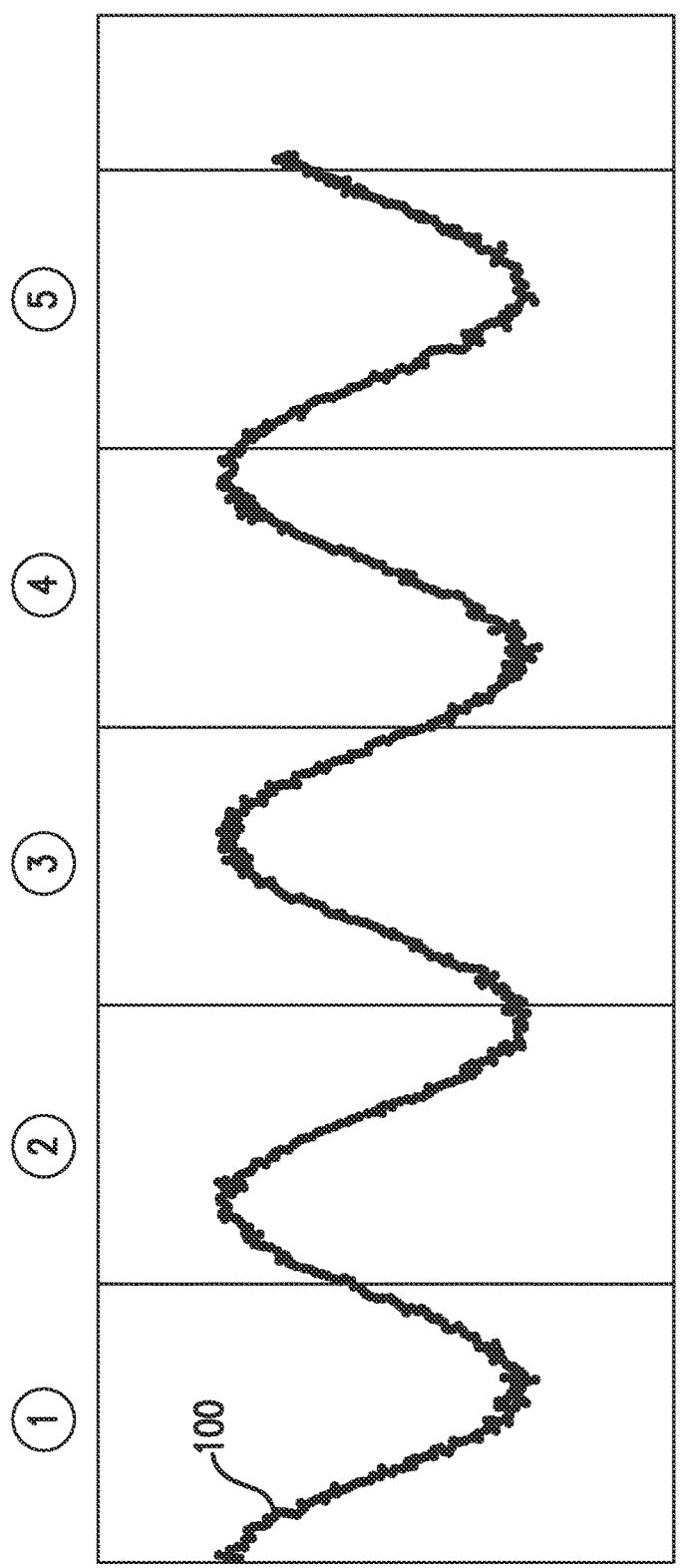
FIG. 1 depicts an example process harmonic manifested across five tires.

It is to be understood by one of ordinary skill in the art that the present discussion is a description of exemplary embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, example aspects of the present disclosure are directed to methods and systems for improving tire uniformity through identification of uniformity attributes, such as process harmonics. More particularly, uniformity measurements acquired according to a non-uniform sampling pattern can be obtained and analyzed to estimate one or more process harmonics (e.g. the magnitude of the process harmonic). The non-uniform sampling pattern can specify the acquisition of uniformity measurements in a varying or irregular manner about one or more revolutions of the tire. The process harmonics estimated from the uniformity measurements can be used to modify the manufacture of tires to improve tire uniformity.

It has been discovered that estimating harmonic components, such as process harmonics, using uniformity measurements acquired using non-uniform sampling patterns can overcome many problems associated with estimating harmonic components using sampling patterns with equally spaced data points. For instance, the non-uniform sampling pattern can more accurately sample a process harmonic, leading to better estimates of the process harmonic. The increased accuracy of the estimates can lead to many advantages, such as increased tire uniformity yield (e.g. % of tires that pass uniformity scrutiny).

More particularly, a uniformity parameter can be analyzed by obtaining a uniformity waveform representative of a plurality of uniformity measurements at a plurality of discrete data points for one or more revolutions of the tire. The uniformity parameter can be, for instance, radial run out, radial force variation, lateral run out, lateral force variation, static balance, tangential force variation or other suitable uniformity parameter. The uniformity measurements can be analyzed to identify one or more harmonics of a uniformity parameter of interest, such as one or more tire harmonics and/or one or more process harmonics.

A tire harmonic has a period that fits an integer number of times within the tire circumference. Typical tire harmonics can be attributable to tread joint width, out-of-roundness of the building drums, press effects, and other effects. Process harmonics have a period that does not fit an integer number of times within the tire circumference. Typical process harmonics can be caused, for instance, in the preparation of a semi-finished product (e.g. a tread band), by thickness variations due to the extruder control system or by rollers that can deform the shape of softer products.

A process harmonic can be expressed or identified in terms of various parameters, including but not limited to the rate (e.g. frequency or period) of introduction relative to the dimensions of the tire (e.g., tire circumference, radius, diameter, discrete number of data points around the tire or the like). The rate of introduction can also be expressed as a harmonic number (e.g. 1.25, 0.8, etc.). When considering a total number of p candidate process effects, the rate of introduction of each process effect can be defined in terms of its respective harmonic number $h_p$.

Harmonic components such as a process harmonic can be identified from uniformity measurements, for instance, by modeling the uniformity measurements as a sum of one or more tire harmonic terms and one or more process harmonic terms. Coefficients associated with the tire harmonic terms and the process harmonic terms can be estimated using statistical analysis, such as a regression analysis or a programming analysis. Characteristics of the process harmonics and tire harmonics can be determined based on the estimated coefficients.

Because the periods of process harmonics do not coincide with tire circumference, the azimuthal location of the peak of the process harmonic shifts from tire to tire. For instance, FIG. 1 depicts an example uniformity waveform representing a process harmonic 100 manifested across five different tires. As shown, the peak of the process harmonic 100 is located at a different azimuthal location for each of the five tires. In certain cases, the peak of the process harmonic can be located between equally spaced data points in a uniform sampling pattern.

To more naturally sample harmonic components such as a process harmonic, aspects of the present disclosure are directed to analyzing uniformity measurements that have been measured using a non-uniform sampling pattern. The non-uniform sampling pattern can specify a plurality of data points for acquisition of uniformity measurements in an irregular or non-uniform manner. For instance, the non-uniform sampling pattern can specify an unequal spacing between data points in the sampling pattern. If multiple revolutions are contemplated, the non-uniform sampling pattern can specify different patterns of data points for each revolution of the tire and/or can specify different target circumferences for acquisition of uniformity measurements for each revolution. This can ensure that different data points are sampled for each revolution of the tire. Specifying the acquisition of the uniformity measurements in an irregular or non-uniform manner can result in data points are more likely to occur at the actual location of the peak of the process harmonic, leading to more accurate estimates of the process harmonic. It also offers advantages when there are multiple competing tire harmonics that are all active simultaneously.

Particular example implementations of the present disclosure can be directed to identifying a non-uniform sampling pattern tailored for estimating a particular harmonic component, such as a particular process harmonic. For instance, the spacing of data points specified by the non-uniform sampling pattern can be determined to best estimate known or suspected process harmonics. Various analysis techniques, such as a matched pattern technique or a statistical search technique (e.g. a lasso search technique) can be used to identify non-uniform sampling patterns for particular process harmonics. In these example implementations, the non-uniform sampling pattern can allow for the acquiring of uniformity measurements at fewer data points when compared to sampling patterns specifying equally spaced data points about a tire.

Example Method for Improving the Uniformity of a Tire

Figure 2:
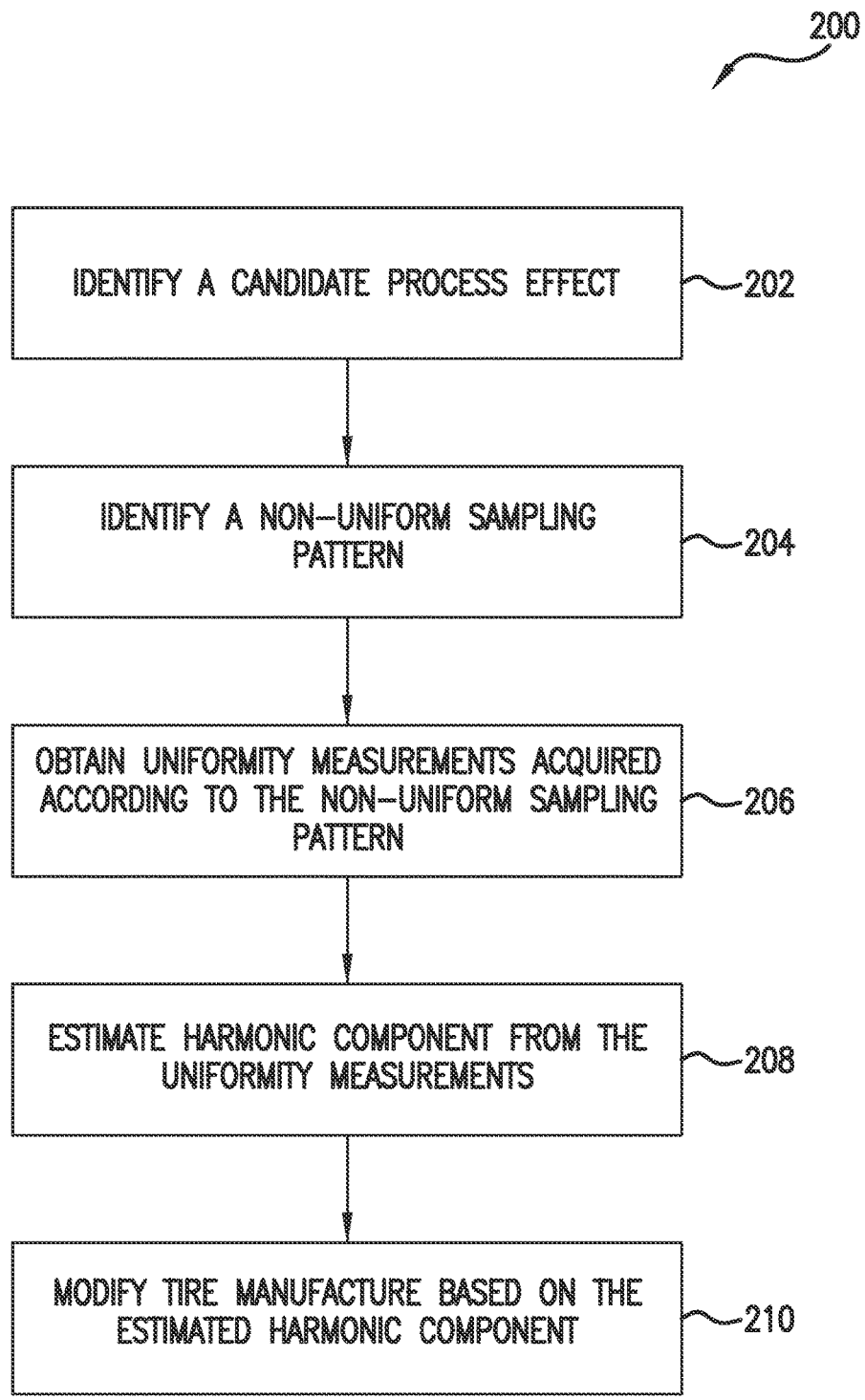
FIG. 2 depicts a flow diagram of an example method for improving the uniformity of a tire according to an embodiment of the present disclosure.

FIG. 2 depicts a flow diagram of an example method (200) for improving the uniformity of a tire according to an example embodiment of the present disclosure. FIG. 2 depicts steps performed in a particular order for purposes of illustration and discussion. Those of ordinary skill in the art, using the disclosures provided herein, will understand that the various steps of any of the methods disclosed herein can be omitted, adapted, expanded, and/or rearranged in various ways. In addition, FIG. 2 will be discussed with reference to identifying a process harmonic from uniformity measurements acquired using a non-uniform sampling pattern. Other harmonic components, such as tire harmonic components, can be identified using the methods disclosed herein without deviating from the scope of the present disclosure.

At (202), the method includes identifying at least one candidate process harmonic. A single process harmonic or multiple process harmonics can be targeted as candidate process harmonics for analysis. The at least one candidate process harmonic can be expressed or identified in terms of various parameters, including but not limited to the frequency or period of introduction relative to the dimensions of the tire. For instance, the candidate process harmonic can be expressed as a harmonic number (e.g. 0.75, 1.25, etc.).

The candidate process harmonics(s) can be known process effects identified based on certain known features of the manufacturing process, or the candidate process harmonic(s) can be unknown. For instance, if the physical process sources are known, it can be possible to identify the candidate process harmonic(s) from certain aspects and/or conditions of the manufacturing process.

If the candidate process harmonics are unknown, the candidate process harmonics can be identified using a variety of search techniques. One example search technique can involve specifying a series of candidate process harmonics in stepped increments over a range of candidate process effects. (e.g. 0.2, 0.3, 0.4 . . . 1.5, etc.). A regression/ programming analysis can identify process harmonics in the range of candidate process harmonics by solving for coefficients associated with each incremental candidate process harmonics in the range. Process harmonics associated with non-negligible coefficients can be determined to contribute to the overall uniformity of the tire.

Other suitable techniques can be used to identify candidate process harmonics without deviating from the scope of the present disclosure. For instance, Bayesian spectral analysis techniques can be applied to a measured uniformity waveform to determine harmonic numbers for a selected number of candidate process harmonics. Such example identification techniques are disclosed in U.S. Patent Application Publication No. 2013/0098148, which is incorporated herein by reference to the extent its teachings are consistent with the present disclosure.

At (204), the method can include identifying a non-uniform sampling pattern for acquisition of uniformity measurements for one or more revolutions of a tire. Identifying a non-uniform sampling pattern can include, for instance, determining a particular sampling pattern in accordance with the example techniques disclosed herein or can include accessing a previously determined non-uniform sampling pattern stored, for instance, in a memory. The non-uniform sampling pattern can specify the acquisition of uniformity measurements for one or more revolutions of a tire in a non-uniform or irregular manner. Example non-uniform sampling patterns that can be analyzed in accordance with aspects of the present disclosure will now be set forth.

In one example embodiment, the non-uniform sampling pattern can specify an unequal or irregular spacing between the data points for acquisition of the uniformity measurements. For instance, the sampling pattern can specify the acquisition of uniformity measurements at 128 data points at unequal spacings. In particular implementation, the non-uniform sampling pattern can specify a random spacing between the data points. For example, if s is defined as equal spacing of tire circumference/8N data points, then the sampling pattern can specify data points 1.0s, 2.0s, 3.5s, 3.75s, 4.0s, 4.25s, 8.0s . . . for each sector of the tire. The spacing between data points can be randomized for a set of tires collectively or can be randomized for each individual tire. A random spacing of data points can be suitable when searching for candidate process harmonics using a search technique.

Figure 3:
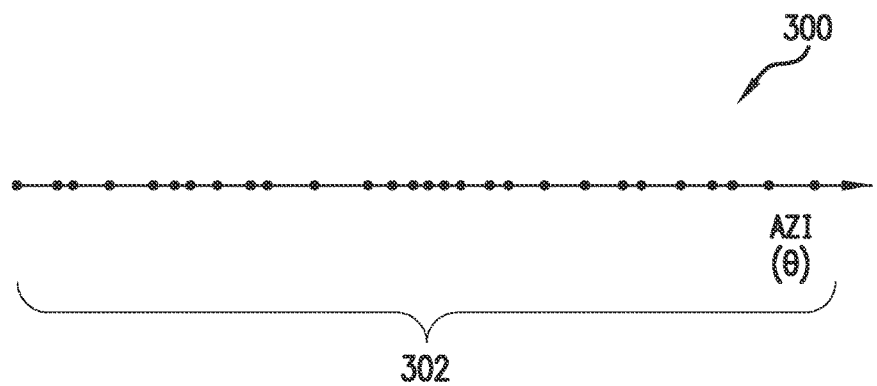
FIG. 3 depicts a non-uniform sampling pattern according to an example embodiment of the present disclosure.

FIG. 3 depicts a representation of a non-uniform sampling pattern 300 specifying unequal spacing between data points according to an example embodiment of the present disclosure. FIG. 3 plots the data points as a function of azimuthal location about a tire (θ). As shown, the non-uniform sampling pattern 300 comprises a plurality of data points 302. The spacing between the data points 302 is unequal.

In another example embodiment, the non-uniform sampling patterns can contemplate the acquisition of uniformity measurements for a plurality of revolutions of a tire. For example, the non-uniform sampling pattern can specify different sampling patterns for each revolution of the tire. This non-uniform sampling pattern can allow for the acquisition of uniformity measurements at different data points for each revolution of the tire, increasing the resolution of the sampling of the uniformity parameter.

Figure 4:
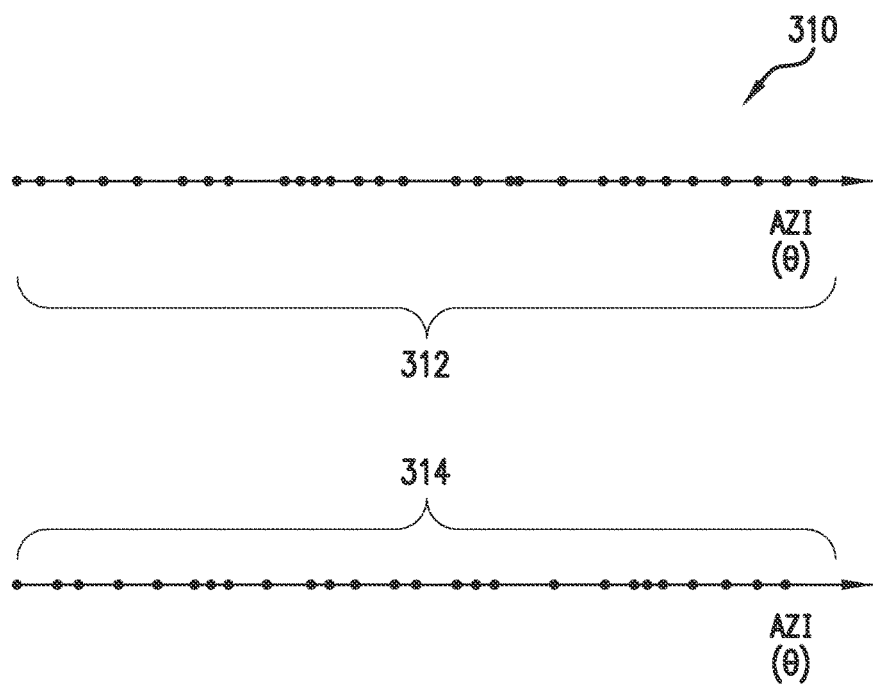
FIG. 4 depicts a non-uniform sampling pattern according to another example embodiment of the present disclosure.

FIG. 4 depicts a representation of a non-uniform sampling pattern 310 specifying different sampling patterns for each revolution of the tire according to an example embodiment of the present disclosure. FIG. 4 plots the data points as a function of azimuthal location about a tire (θ). As shown, the non-uniform sampling pattern 310 can include a first pattern of data points 312 for a first revolution of the tire. The non-uniform sampling pattern can include a second pattern of data points 314 for the first revolution of the tire. The first pattern of data points 312 is different from the second pattern of data points 314. The spacing between data points in patterns 312 and 314 depicted in FIG. 4 is unequal. However, the spacing between data points in each of the individual patterns 312 and 314 can be equal without deviating from the scope of the present disclosure.

In yet another example embodiment, the non-uniform sampling pattern can specify different target circumferences for acquisition of data points for each revolution of the tire. For instance, the non-uniform sampling pattern can specify a first target circumference for acquiring uniformity measurements during the first revolution and a second target circumference for acquiring uniformity measurements during the second revolution. The first target circumference can be different than the second target circumference (e.g. the first and second target circumferences can have different starting points and/or different point-to-point spacings). Each of the target circumferences can be not equal to the true tire circumference. This non-uniform sampling pattern can also allow for the acquisition of uniformity measurements at different data points for each revolution of the tire, increasing the resolution of the sampling of the uniformity parameter. In a particular aspect, the target circumference can be selected based on the period of a candidate process harmonic so that the process harmonic is more accurately sampled.

Figure 5:
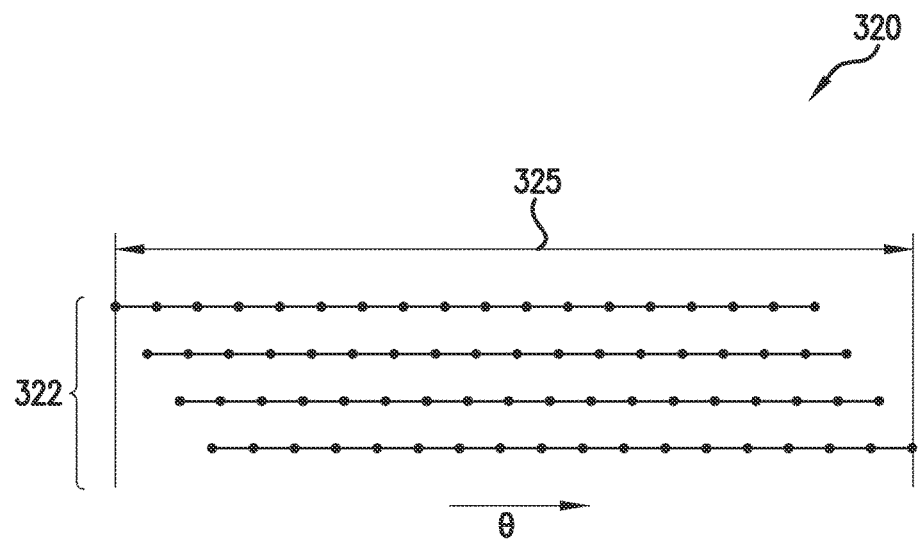
FIG. 5 depicts a non-uniform sampling pattern according to another example embodiment of the present disclosure.

FIG. 5 depicts a representation of a non-uniform sampling pattern 320 specifying different target circumferences for acquisition of data points for each revolution of the tire. The non-uniform sampling pattern 320 specifies four different target circumferences 322 for four different revolutions of a tire. More or fewer target circumferences could be specified without deviating from the scope of the present disclosure. Each of the target circumferences 322 has a span that is less than the true tire circumference 325. The target circumferences 322 collectively specify the sampling of the entire span of the tire circumference 325. The spacing of data points within each target circumference 322 can be equal or can be irregular.

In yet other example embodiments, the non-uniform sampling pattern can be specifically tailored for estimating a particular harmonic component, such as a particular candidate process harmonic. For instance, the spacing of data points specified by the non-uniform sampling pattern can be determined to best estimate known or suspected process harmonics. In these example embodiments, the sampling pattern can require less data points to estimate the particular harmonic component.

As an example, a non-uniform sampling pattern can be identified based at least in part on a known candidate process harmonic using a matching technique. The matching technique can select data points that provide an equal spacing between magnitudes of the process harmonic rather than regular spacing along the azimuth of the tire. More particularly, a subset of n data points can be identified from the plurality of data points N to provide an equal spacing between cosine values C provided by the following:

$$C = \cos\left(\frac{h_k * i * 2\pi}{N}\right)$$

where C is the cosine value for data point i, $h_k$ is the harmonic number associated with the candidate process effect, and N is the number of test data points. For example, n=21 data points that give a cosine value from −1 to 1 in stepped increments of 0.1 can be identified as the data points for the non-uniform sampling pattern.

Figure 6:
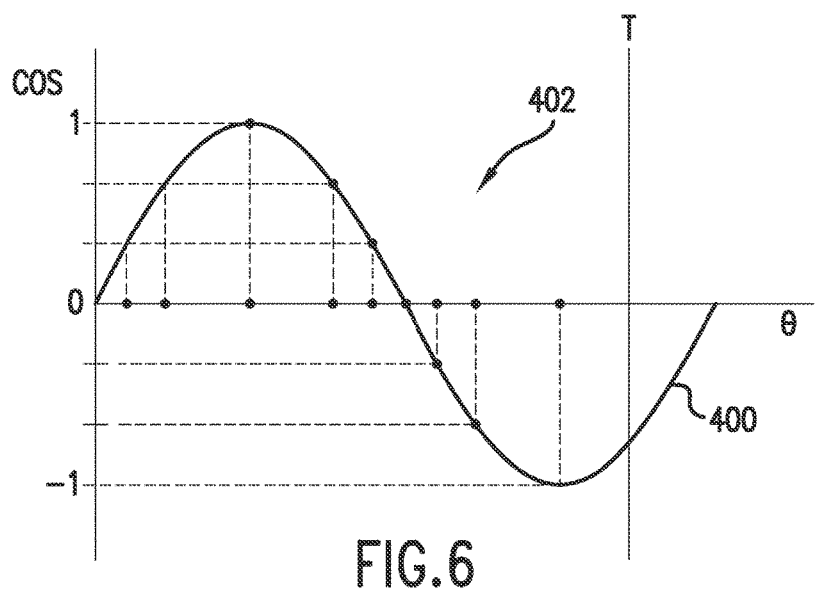
FIG. 6 depicts the identification of data points that provide an equal spacing between magnitudes of the process harmonic according to an example embodiment of the present disclosure.

FIG. 6 depicts the identification of data points that provide an equal spacing between magnitudes of the process harmonic according to an example embodiment of the present disclosure. FIG. 6 plots azimuth about the tire along the abscissa and magnitude of the cosine value associated with the process harmonic along the ordinate. FIG. 6 illustrates a waveform 400 associated with the process harmonic. As shown, the waveform 400 has a period that does not coincide with the period T of the tire circumference. The non-uniform sampling pattern can be identified as the data points 402 associated with cosine values in equally spaced increments between −1 and 1. FIG. 6 depicts seven identified data points 402 for ease of illustration. More or fewer data points 402 can be identified without deviating from the scope of the present disclosure.

Figure 7:
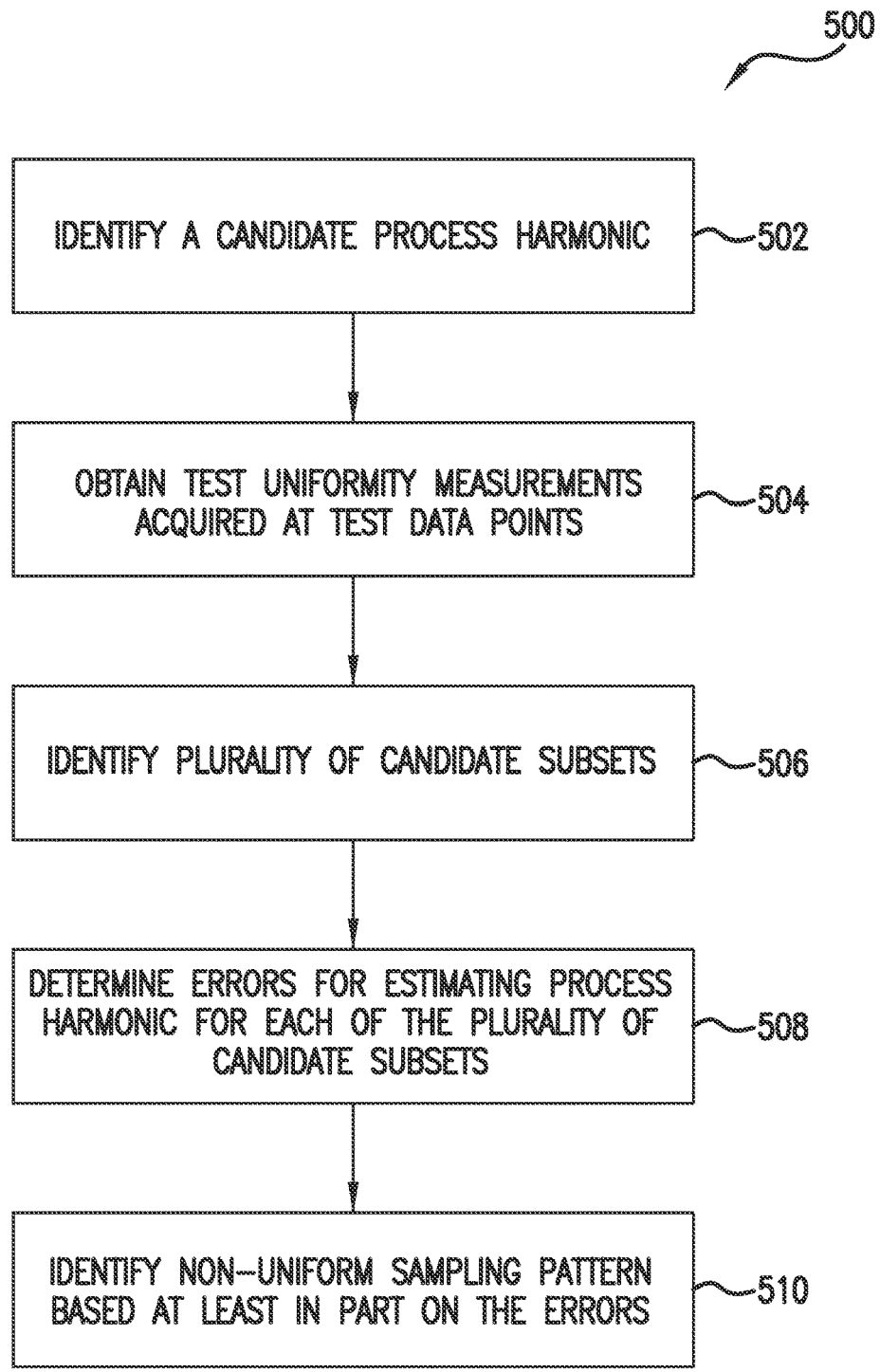
FIG. 7 depicts a flow diagram of an example method for identifying a non-uniform sampling pattern that is optimized for identifying a candidate process harmonic according to an example embodiment of the present disclosure.

A non-uniform sampling pattern can also be identified using an optimization problem that identifies a set of data points to provide the best estimate of the candidate process harmonic or other harmonic component. FIG. 7 depicts an example method (500) for identifying a non-uniform sampling pattern that is optimized for identifying a particular process harmonic according to an example embodiment of the present disclosure.

At (502), the method can include identifying a candidate process harmonic. The candidate process harmonic can be identified as a known or suspected process harmonic. The candidate process harmonic can be expressed or identified in terms of various parameters, including but not limited to the frequency or period of introduction relative to the dimensions of the tire. For instance, the candidate process effect can be expressed as a harmonic number (e.g. 0.75, 1.25, etc.).

At (504), the method includes obtaining test uniformity measurements acquired at test data points for a set of tires. Obtaining the test uniformity measurements can include actually performing the test uniformity measurements using a uniformity measurement machine or accessing the uniformity measurements stored in, for instance, a memory of a computing device. The test uniformity measurements can be performed for the set of tires using a relatively high resolution of test data points. For instance, test uniformity measurements for 4096 data points for each tire in the set of test tires can be acquired. A subset of these test data points can be identified as the optimal non-uniform sampling pattern.

At (506), the method includes identifying a plurality of candidate subsets of test data points. Each candidate subset of test data points can include a different combination of test data points. For instance, each possible subset of the plurality of test data points can be identified as a candidate subset.

At (508), an error in estimating the candidate process harmonic is determined for each candidate subset. The error can be based on a variance and/or covariance of the estimates. More particularly, a statistical analysis can be performed for each candidate subset to estimate the candidate process harmonic. The estimates for each candidate subset will necessarily have some error which can be expressed a variance and covariance associated with the estimated process harmonic.

At (510), the non-uniform sampling pattern can be identified based at least in part on the errors. For instance, a statistical analysis technique, such as a LASSO search technique, can identify a candidate subset that minimizes a cost factor. The cost factor can be determined based on the error (e.g. the variance and/or covariance) in the estimated process harmonics. The identified candidate subset of data points can be selected as the non-uniform sampling pattern for estimation of the process harmonic.

Referring back to FIG. 2 at (206), the method can include obtaining uniformity measurements acquired according to the non-uniform sampling pattern. As used herein, "obtaining uniformity measurements" can include actually performing the uniformity measurements using a uniformity measurement machine or accessing the uniformity measurements stored in, for instance, a memory of a computing device. The uniformity measurements can be of any suitable uniformity parameter. For instance, the uniformity measurements can correspond, for example, to such uniformity parameters as radial run out, lateral run out, mass variance, balance, radial force variation, lateral force variation, tangential force variation, and other parameters.

The uniformity measurements can be acquired according to any of the example non-uniform sampling patterns discussed herein. A variety of measurement techniques can be used to acquire the uniformity measurements according to a non-uniform sampling pattern. For instance, the rotational speed of the tire can be varied during acquisition of the uniformity measurements by a uniformity measurement machine to obtain uniformity measurements at irregular spaced data points about the tire.

At (208), the method can include estimating one or more harmonic components (e.g. tire harmonics and/or process harmonics) from the uniformity measurements. One example approach to estimating one or more harmonic components can be decomposing the uniformity measurements into one or more harmonic components using a Fourier decomposition. The Fourier decomposition can be used to identify the magnitude and azimuthal location of the peak of the uniformity parameter across a plurality of harmonics. Fourier decomposition can be suitable for identifying tire harmonic components of the uniformity parameter.

Another example approach to estimating one or more harmonic components can include modeling the uniformity measurements as a function of one or more tire harmonic terms and/or one or more process harmonic terms. One example model is provided below:

$$w = X\beta + \varepsilon$$

where w is the particular uniformity measurement at a data point, X represents a design matrix having one or more tire harmonic terms and one or more process harmonic terms. The process harmonic terms can be identified based on the candidate process harmonic or using a search technique as discussed above. $\beta$ represents the vector of coefficients to be estimated for the one or more tire harmonic terms and one or more process harmonic terms. $\varepsilon$ represents the residual or error vector A statistical analysis technique, such as regression or programming technique, can be used to estimate the coefficients. Under a regression approach, coefficients are estimated to best fit the mathematical model to the data points in the uniformity measurements. Under a programming approach, the coefficients are estimated to minimize the difference or error between the uniformity measurement and an estimated measurement using a model.

Attributes of the harmonic components can be determined from the estimated coefficients. For instance, the magnitude of a process harmonic can be determined from the estimated coefficients for the process harmonic term. As an example, the magnitude can be determined based on the squares of the coefficients associated with the process harmonic term.

Once the one or more harmonic components have been estimated, the manufacture of tires can be modified to improve tire uniformity as shown (210) of FIG. 2. For example, modifying the manufacture of tire can include sorting or grading tires based at least in part on the harmonic component estimates. Providing more accurate estimates of the harmonic component (with or without process harmonic components) through use of a non-uniform sampling pattern can lead to increased tire uniformity yield (e.g. more tires satisfy uniformity requirements).

As another example, an estimated process harmonic can be compared to a threshold. Corrective action can be taken if the estimated process harmonic exceeds the threshold. The particular process harmonic can be used to determine the offending part of the tire manufacturing process that needs to be corrected/adjusted. One can apply methods to 1) suppress the process harmonic effect, 2) adjust for it using another process step, or 3) optimizing it against another tire or process harmonic. For instance, an extruder cycle can be matched with an estimated process harmonic having a harmonic number of 1.2 in tread thickness variation. If the amplitude of the process harmonic exceeds a given level (e.g. 0.25 kg force) then corrective action can be taken to address the extruder cycle. Such corrective action can include retuning the extruder control system algorithm, changing the extruder speed, and/or purposely stretching the tread to counteract the variation.

As another example, the estimated process harmonic can be determined across different time intervals of the manufacturing process. The estimated process harmonic can be compared across the time intervals to assess the stability of the process effects and to determine if any new upsets in the manufacturing process have occurred. For instance, if an estimated process harmonic magnitude changes across different time intervals, this can provide an indication of the need for a maintenance event to address the particular process effect. Specific changes in the process harmonic number can be correlated with specific operational changes in the production.

As yet another example, the manufacture of a tire can be modified to achieve tire uniformity improvement by altering the relative angular position of known manufacturing components in a tire to reduce the magnitude of the measured uniformity parameter for one or more tire harmonics of interest. For example, the extrusion induced cycle at a particular process harmonic can be matched with a storage induced cycle at the same process harmonic to achieve a more uniform shape for each individual tire.

Example System for Improving the Uniformity of a Tire

Figure 8:
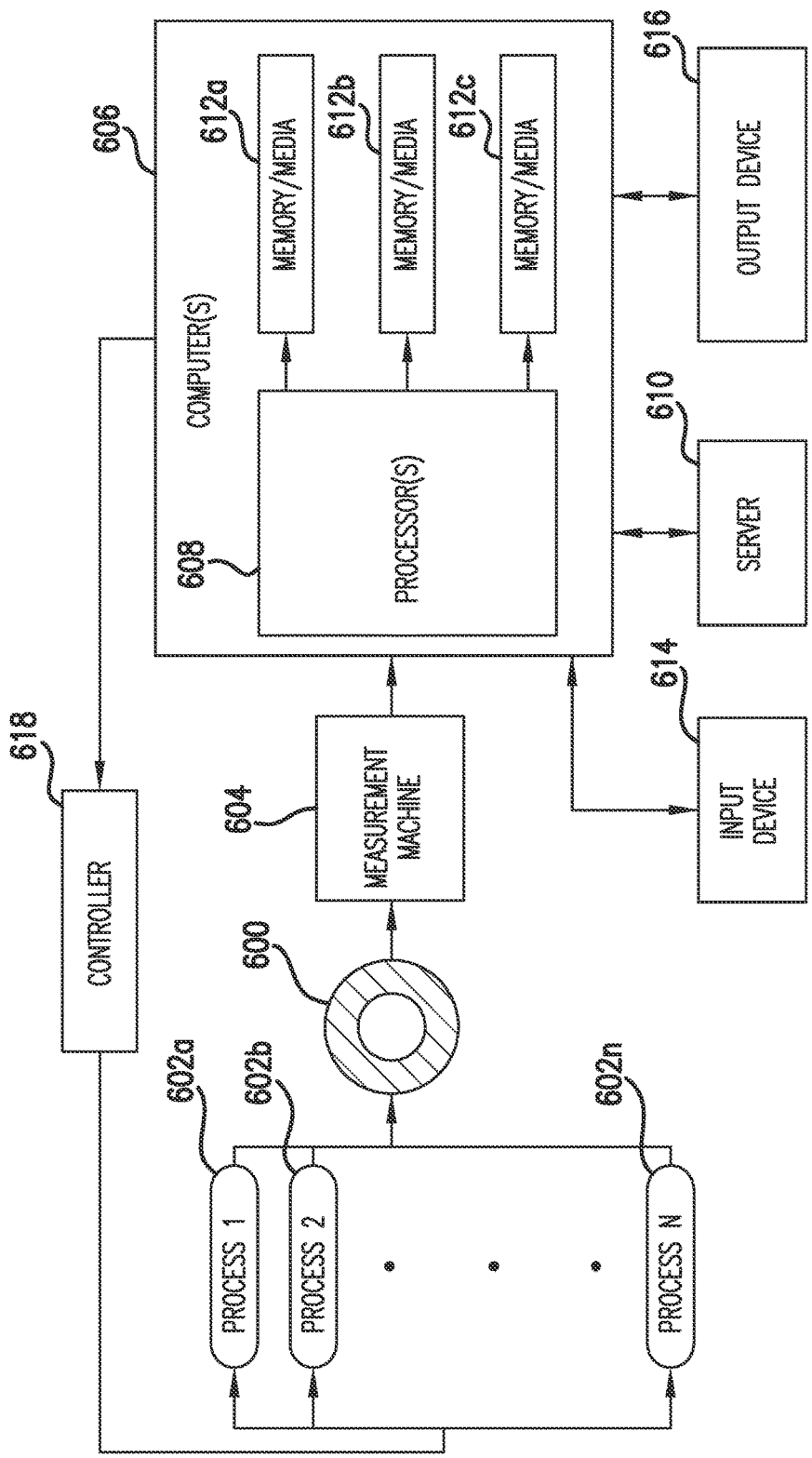
FIG. 8 depicts a system for improving the uniformity of a tire according to an example embodiment of the present disclosure.

Referring now to FIG. 8, a schematic overview of example system components for implementing the above-described methods is illustrated. An example tire 600 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing press, and curing the finished green tire, etc. Such respective process elements are represented as 602a, 602b, . . . , 602n in FIG. 8 and combine to form example tire 600. It should be appreciated that a batch of multiple tires can be constructed from one iteration of the various processes 602a through 602n.

Referring still to FIG. 8, a measurement machine 604 is provided to obtain the uniformity measurements of the tire 600. The uniformity measurement machine 604 can be configured to measure radial run out and other uniformity parameters (e.g. radial force variation, lateral force variation, tangential force variation) of the tire 600. In general, such a uniformity measurement machine 604 can include sensors (e.g. laser sensors) to operate by contact, non-contact or near contact positioning relative to tire 600 in order to determine the relative position of the tire surface at multiple data points according to a non-uniform sampling patter as the tire rotates about a center line. The uniformity measurement machine 604 can also include a road wheel used to load the tire to obtain force measurements as the tire 600 is rotated. According to aspects of the present disclosure, the uniformity measurement machine 604 can be configured to vary the rotational speed and/or load applied to the tire 600 to obtain uniformity measurements according to a non-uniform sampling pattern.

The measurements obtained by measurement machine 604 can be relayed such that they are received at one or more computing devices 606, which may respectively contain one or more processors 608, although only one computer and processor are shown in FIG. 8 for ease and clarity of illustration. Processor(s) 608 may be configured to receive input data from input device 614 or data that is stored in memory 612. Processor(s) 608, can then analyze such measurements in accordance with the disclosed methods, and provide useable output such as data to a user via output device 616 or signals to a process controller 618. Uniformity analysis may alternatively be implemented by one or more servers 610 or across multiple computing and processing devices.

Various memory/media elements 612a, 612b, 612c (collectively, "612") may be provided as a single or multiple portions of one or more varieties of non-transitory computer-readable media, including, but not limited to, RAM, ROM, hard drives, flash drives, optical media, magnetic media or other memory devices. The computing/processing devices of FIG. 8 can be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

In one implementation, the processor(s) 608 can execute computer-readable instructions that are stored in the memory elements 612a, 612b, and 612c to cause the processor to perform operations. The operations can include estimating one or more harmonic components from the uniformity measurements acquired according to the non-uniform sampling pattern.

Industrial Results

Uniformity measurements of radial force variation were obtained for a set of 98 tires. The uniformity measurements were obtained for 4096 equally spaced data points per tire revolution over two consecutive tire revolutions. The uniformity measurements were evaluated to investigate the performance of non-uniform sampling patterns on estimated tire and process harmonics. Four different approaches were investigated, including: (1) regular spacing between data points; (2) random spacing between data points; (3) data points identified using a matching technique; and (4) an optimized non-uniform sampling pattern identified using a LASSO search technique.

The regular spacing approach represents the sampling of the tire with 128 evenly-spaced data points per rotation. The random spacing approach selects a single set of 128 points randomly from the available 4096 and applies this to every tire. The matching approach identifies 21 points that form a regular spacing in a cosine space. The LASSO search approach identified a sparse set of data points that best control both bias and variance in the estimates.

In the evaluation of each approach, the standard deviation of the estimated coefficients for the first tire harmonic and a process harmonic associated with a harmonic number of 0.752 were obtained. All of the approaches reduce the amount of memory necessary to store the uniformity measurements for each tire.

The summaries of the variance results from the different approaches is provided in Table 1 below:

TABLE 1

| Modification | N (number of data points) | Std dev (First Tire Harmonic) | Std dev (Process Harmonic) | Pct std dev reduction (First Tire Harmonic) | Pct std dev reduction (First Process Harmonic) |
|---|---|---|---|---|---|
| Regular | 128 | 0.86 kgs | 0.59 kgs | 0 | 0 |
| Random | 128 | 0.82 kgs | 0.46 kgs | 5.4% | 22.2% |
| Matched | 21 | 0.82 kgs | 0.57 kgs | 4.9% | 3.2% |
| Lasso | 8 | 0.58 kgs | 0.36 kgs | 33.1% | 39.4% |

As demonstrated, the approaches using a non-uniform sampling plan can provide a reduced variance in estimates of both tire harmonics and process harmonics. This reduced variance can lead to greater uniformity yield due to the fact that fewer tires will have uniformity values (e.g. the first harmonic of radial force variation) that exceed sorting limits. The exact yield will depend on the particular production batch and sorting limits but a typical set of values applied to this example shows the yield improvements in Table 2 below:

TABLE 2

| Modification | N | Regular yield | Modified yield | Pct yield gain |
| --- | --- | --- | --- | --- |
| Random | 128 | 75.8% | 78.5% | 3.6% |
| Matched | 21 | 75.8% | 78.5% | 3.6% |
| Lasso | 8 | 75.8% | 78.7% | 3.8% |

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A system for improving the uniformity of a tire, the system comprising:
   a uniformity measurement machine configured to obtain uniformity measurements for the tire according to a non-uniform sampling pattern for one or more revolutions of a tire, the non-uniform sampling pattern having a plurality of data points; and
   one or more computing devices coupled to the measurement machine, the one or more computing devices comprising one or more processors and at least one non-transitory computer readable medium, the at least one non-transitory computer readable medium storing computer-readable instructions that, when executed by the one or more processors, cause the one or more processors to perform operations, the operations comprising estimating a harmonic component of the uniformity parameter using the plurality of uniformity measurements;
   wherein the non-uniform sampling pattern specifies an unequal spacing between the plurality of data points.

2. The system of claim 1, wherein the non-uniform sampling pattern specifies a random spacing between the plurality of data points.

3. The system of claim 1, wherein the plurality of uniformity measurements are acquired according to the sampling pattern using varying rotational speeds of a tire.

4. The system of claim 1, wherein the plurality of uniformity measurements are obtained for a plurality for the one or more tires, the plurality of revolutions comprising a first revolution and a second revolution.

5. The system of claim 4, wherein the non-uniform sampling pattern specifies a first pattern of data points for the second revolution and a second pattern of data points for the second revolution, the first pattern of data points having a different spacing between data points than the second patter of data points.

6. The system of claim 4, wherein the non-uniform sampling pattern specifies a first target circumference for the first revolution and a second target circumference for the second revolution, the first target circumference being different from the second target circumference.

7. The system of claim 1, wherein the harmonic component comprises a process harmonic.

\* \* \* \* \*